United States Patent [19]

Graafmann et al.

[11] 4,206,785
[45] Jun. 10, 1980

[54] PLASTIC TUBE PART, PARTICULARLY THERMOPLASTIC TUBE PART

[75] Inventors: Jürgen Graafmann, Ibbenbüren; Eberhart Setzer, Twist, both of Fed. Rep. of Germany

[73] Assignee: Wavin B.V., Zwolle, Netherlands

[21] Appl. No.: 894,005

[22] Filed: Apr. 27, 1978

[51] Int. Cl.² .............................................. F15D 1/00
[52] U.S. Cl. .............................. 138/149; 138/DIG. 9; 181/252
[58] Field of Search ................. 138/140, 149, DIG. 9; 181/222, 252, 282, 284, 256

[56] References Cited

U.S. PATENT DOCUMENTS

| | | | |
|---|---|---|---|
| 3,698,440 | 10/1972 | Matthieu et al. | 138/149 |
| 3,698,993 | 10/1972 | Rauh | 181/294 |
| 4,034,994 | 7/1977 | Ohta et al. | 138/109 |

Primary Examiner—Steven L. Stephan
Attorney, Agent, or Firm—Wilkinson, Mawhinney & Theibault

[57] ABSTRACT

Thermoplastic tube part provided with a polyurethan foam layer with closed skin and containing an inorganic filler for reducing sound production during flow of water through such tube parts.

3 Claims, 2 Drawing Figures

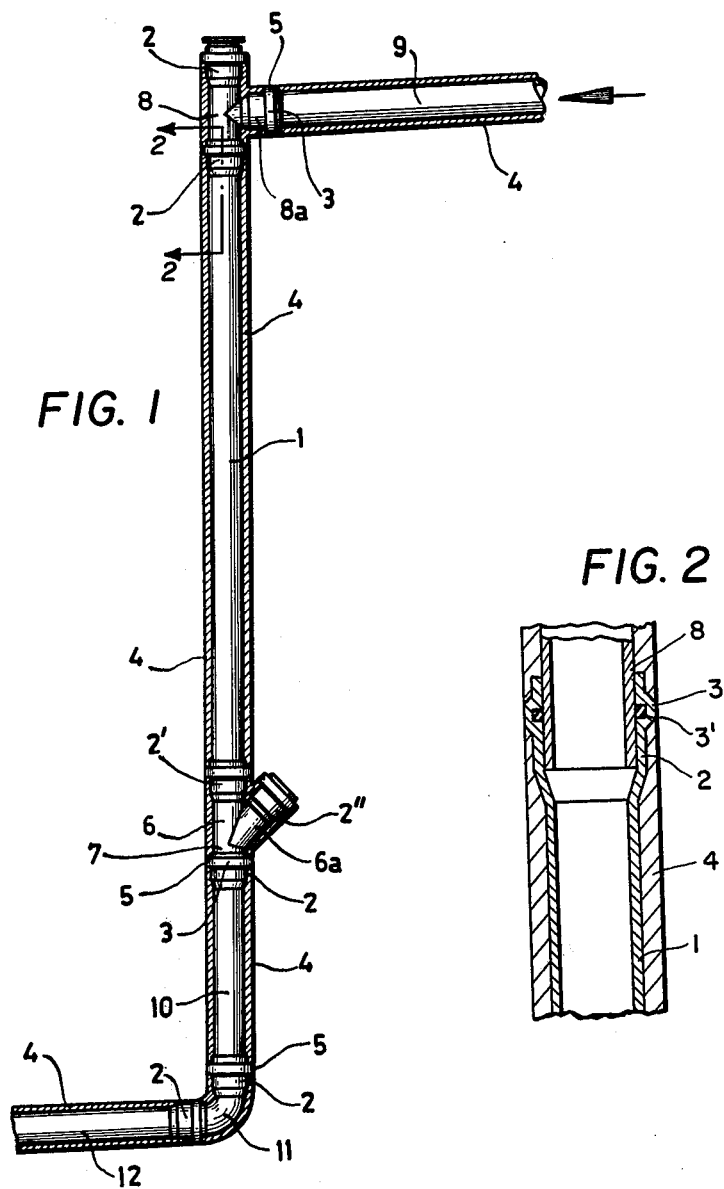

PLASTIC TUBE PART, PARTICULARLY THERMOPLASTIC TUBE PART

BACKGROUND OF THE INVENTION

Our invention relates to a plastic tube part, particularly a thermoplastic tube part.

Plastic tube parts, particularly thermoplastic tube parts such as polyvinylchloride tube parts are generally used for water transport in houses or buildings.

When waste water is discharged through pipe systems of this type, the sound insulation of said pipes is unsatisfactory in comparison with case iron and asbestos cement pipes. In tube systems of this type the generally used branch parts appear to cause the sound hindrance.

So as to make said branch parts sound proof to a great extent, ons has tried to improve the sound insulation by changing the branch angle of the branch parts. Branch parts have been used with branch angles of 87° and 45°. Said changes do not produce the improvements aimed at. Also when bends having different radius of curvature were used, no decrease of sound could be achieved.

SUMMARY OF THE INVENTION

It is an object of the invention to provide a plastic tube part particularly a thermoplastic tube part, which will cause a notable sound reduction, when applied in a pipe system consisting of plastic tubes through which waste water flows.

According to the invention this is achieved in that the plastic tube part is provided with a sound insulating layer of a soft foam plastic having at least a closed skin on one surface.

When such a type of sound insulating layer is applied, the noise occuring when water or fluid is discharged through such a pipe system for conveying waste water, can be notably decreased.

The sound insulating layer appropriately has a closed skin at both surfaces and consists preferably of an integral soft polyurethan foam.

As a matter of fact a soft polyurethan foam of this type tends already to have a closed skin that is a pore free surface of polyurethan on both sides during its manufacture. Thus such a type of material can be applied, respectively foamed upon a plastic tube directly.

The said sound insulating layer may contain advantageously an inorganic filling agent, particularly in a proportion of 150 to 250% by weight of said foam which provides extremely good sound insulating properties.

The inorganic filling agent may be calciumcarbonate, bariumsulfate or particularly sodiumchloride.

In order to obtain the desired sound insulation the sound insulating layer appropriately has a homogeneous thickness.

The outer diameter of the sound insulating layer is at the most equal to the periphery of the outer diameter of an outer circular elevation upon a socket end of the tube part, which socket end comprises an internal groove.

Owing to these features the danger of damages to the sound insulating layer when the plastic tubes are mounted for forming a pipe system for transporting waste water to the sewage system, is extremely reduced, particularly when such plastic tubes are installed in buildings, like houses.

The fact that a considerable sound insulation can be obtained by applying a plastic tube part with a sound insulating layer consisting of a soft plastic foam provided with a non porous skin is very surprising. The present state of the art only indicates that only open pore foams having a suitable thickness, can produce a satisfactory sound insulation. The thickness of walls considered to be suitable for that aim, is however not acceptable when mounting pipe lines or pipe systems. When said thick layers of open pore foam are afterwards installed at building sites, maintaining said wall thicknesses cannot be ensured.

In accordance with the invention a sound insulation up to a sound value of e.g. 30 Decibel can be obtained when soft foam layers consisting of integral polyurethan foam with 150% by weight barium-sulfate and having a thickness of 1 cm, are used.

A further advantage of a plastic tube part according to the invention is that the tube parts are less liable to damages by impact, since the impact is not directly carried out upon the plastic pipe parts, but firstly upon the sound insulating layer.

DESCRIPTION OF A PREFERRED EMBODIMENT

A number of sound measurements was carried out upon on plurality of tubes of polyvinylchloride, having a wall thickness of 3.2 mm and a diameter of 110 mm and compared with tubes of the same thickness and diameter of other materials.

Said results were obtained by measurements within a test space, having a floor surface of 1.25 × 1.25 m and a height of 2.5 m. Said space was covered all over with sound insulating material. 27 liter water per minute were introduced into the pipe. The sound of flow of this amount of waste water was measured by means of a sound measuring device of Bruel & Kjoer, Copenhagen, Type 2209 with a switched on filter A. Besides the sound was registered upon a sound track.

The tubes as used in the experiments present the following properties:

1. Cast iron tube of 110 mm.
2. Polyvinylchloride tube of 110 mm diameter,; wall thickness 3.2 mm with a branch piece under a branch piece of 87° having a polyurethan integral layer of soft foam of a thickness of 10 mm with 200% by weight bariumsulfate.
3. Polyvinylchloride tube, diameter 110 mm, wall thickness 3.2 mm having a branch pipe with an angle of 87° C. and a polyurethan integral soft foam layer with a thickness of 10 mm;
4. Polyvinylchloride tube, diameter 110 mm, wall thickness 3.2 mm having a branch piece with an angle of 87° and a thick resilient foam layer with a thickness of 10 mm, containing 150% by weight bariumsulfate;
5. Polyvinylchloride tube, diameter 110 mm, wall thickness 3.2 mm having a branch piece with an angle of 87°, without any insulation.
6. Polyvinylchloride tube, diameter 110 mm, wall thickness 3.2 mm with a Swept-Entry-branch piece, under an angle of 87°, without insulation;
7. Polyvinylchloride tube, diameter 110 mm, wall thickness 3.2 mm without any branch piece or insulation.

The results of the experiments summarized in Table A prove that when layers of a soft foam with a high specific weight are used, a satisfactory sound reduction is obtained at a relative small wall thickness. The decibels were measured between 200 and 2500 Hz.

The invention will now be further explained by the drawing showing a pipe system of polyvinylchloride.

FIG. 1 is a view of a pipe installation incorporating this invention.

FIG. 2 is an enlarged section taken on line 2—2 of FIG. 1.

The drawing shows a part of a pipe system comprising a straight pipe part 1 with a socket end 2 which is connected with a branch piece 8 having an angle of 87°. Said branch piece is connected at its upper end with a socket end 2 for introducing another tube part, whereas the branch portion 8a of the branch piece 8 is a socket end 2 wherein a male part of another straight tube part 9 is accomodated.

The end which is not connected with the socket 2 and which is a male part of the plastic tube part 1 is accomodated in a socket end 2' of a branch piece having an angle of 45° and a branch piece portion 6a which is connected in turn with a socket end 2'. The male end 7 of the branch piece 6 is accomodated in another straight tube part 10 within the socket 2. The lower male end of the tube part 10 is disposed within the socket 2 of a bend 11 having a radius of curvature or a bend length of 90°. The male end of the bend 11 is accomodated in a straight tube piece 12 in the socket end 2.

The socket end 2, 2', 2" always comprises an internal groove 3 for receiving a sealing ring 3'. Said groove 3 is formed by deforming the socket ends 2, 2' so that the outer side of the socket ends always comprise an annular elevation 5.

On the outer side of the plastic tube parts, that is the straight tube parts 1, 9, 10, 12 as well as on the branch pieces 6, 8 and the bend 11, there is always a sound insulating layer of integral polyurethan soft foam comprising bariumsulfate in a mixture of 200% by weight with respect to the foam weight, the volume weight being 800 kg/m³. The foam has a closed polyurethan skin on both sides. The thickness of the sound insulating layer 4 actually equalizes the diameter of the circular elevation 5 upon the socket ends 2, 2', 2".

A sound insulating layer of this type will produce an excellent sound insulation when water or liquids are flowing through the pipe system. It is to be recommended that the polyurethan contains fire resistant agents.

In a preferred embodiment the inorganic filler is sodiumchloride as this filler improves the fire resistance and allows a higher amount of filler due to the high weight of sodiumchloride.

TABLE A

| Type of pipe | Tube material | Branch 87° | Insulation foam | BaSO₄ | Sound value dB |
|---|---|---|---|---|---|
| 1 | cast iron | yes | — | — | 34 |
| 2 | PVC | yes | I.W. | 200 | 32 |
| 3 | PVC | yes | I.W. | — | 35-36 |
| 4 | PVC | yes | E.S. | 150 | 36 |
| 5 | PVC | yes | — | — | 42-43 |
| 6 | PVC | Swept-Entry | — | — | 42 |
| 7 | PVC | no | — | — | 36-37 |

What we claim is:

1. A thermoplastic tube part having a socket end provided with an internal groove chamber for accomodating sealing means parts, said thermoplastic tube part being provided with a sound-insulating layer of a soft polyurethan foam plastic, having at least a closed skin on its outer surface, said foam plastic layer having been foamed onto the outer surface of a thermoplastic tube part chosen from plastic tubes of polyvinylchloride and polyolefin tubes, wherein the outer diameter of the sound insulating layer is at most equal to the greatest outer diameter of the socket end and said foam plastic contains inorganic filling agent particles in an amount comprised between 150 and 250% by weight of the foam.

2. A thermoplastic tube part according to claim 1 wherein the amount of inorganic filling agents is comprised between 150 and 250% by weight of the foam.

3. A thermoplastic tube part according to claim 1 wherein the thermoplastic tube part is connected with an other thermoplastic tube part by means of a socket part being integral with one of the thermoplastic tube parts, the foam layer on the two thermoplastic tube part does not extend beyond the greatest outer diameter of the socket part.

* * * * *